US009669719B1

(12) United States Patent
Gerber et al.

(10) Patent No.: US 9,669,719 B1
(45) Date of Patent: Jun. 6, 2017

(54) MULTI-PROTOCOL CHARGE PORT FOR AN ELECTRIC VEHICLE

(71) Applicant: Proterra Inc., Greenville, SC (US)

(72) Inventors: John A. Gerber, Greer, SC (US); Seamus T. McGrath, Simpsonville, SC (US); Roger A. Innes, Asheville, NC (US); Timothy J. McCartney, Greer, SC (US); Keyur M. Shah, Erie, PA (US)

(73) Assignee: Proterra Inc., Greenville, SC (US)

(*) Notice: Subject to any disclaimer, the term of this patent is extended or adjusted under 35 U.S.C. 154(b) by 0 days.

(21) Appl. No.: 15/227,163

(22) Filed: Aug. 3, 2016

(51) Int. Cl.
*H02J 7/00* (2006.01)
*B60L 11/18* (2006.01)

(52) U.S. Cl.
CPC ....... *B60L 11/1818* (2013.01); *B60L 11/1838* (2013.01); *B60L 2200/18* (2013.01)

(58) Field of Classification Search
CPC .................. B60L 11/1816; B60L 11/1818
USPC .................................. 320/108, 109; 701/22
See application file for complete search history.

(56) References Cited

U.S. PATENT DOCUMENTS 5,548,200 A  8/1996  Nor et al.
9,352,658 B2  5/2016  Morris
2010/0161481 A1  6/2010  Littrell
2011/0025267 A1  2/2011  Kamen
2011/0254504 A1  10/2011  Haddad
2013/0024306 A1  1/2013  Shah et al.
2013/0069589 A1*  3/2013  Kai ........................ H02J 7/0042
                                                              320/109
2013/0110296 A1*  5/2013  Khoo .................. B60L 11/1825
                                                              700/286
2013/0127416 A1  5/2013  Karner et al.
2013/0193918 A1  8/2013  Sarkar
2014/0062394 A1*  3/2014  Khan .................. B60L 11/1812
                                                              320/108

* cited by examiner

*Primary Examiner* — Drew A Dunn
*Assistant Examiner* — Zixuan Zhou
(74) *Attorney, Agent, or Firm* — Bookoff McAndrews, PLLC

(57) ABSTRACT

A method of charging an electric vehicle at a charging station includes electrically connecting the charging station to the vehicle. The charging station may be configured to charge the vehicle using a charging station charge protocol and the vehicle may be configured to receive the charge using a vehicle charge protocol. The vehicle receives a signal indicative of the charging station charge protocol and selects the vehicle charge protocol based on this signal. The vehicle is then charged using the selected vehicle charge protocol. While selecting, the vehicle may select one charge protocol from multiple charge protocols supported by the vehicle to match the charging station charge protocol.

20 Claims, 4 Drawing Sheets

MULTI-PROTOCOL CHARGE PORT FOR AN ELECTRIC VEHICLE

TECHNICAL FIELD

The current disclosure relates to systems and methods for charging an electric vehicle at charging stations using different charge protocols.

BACKGROUND

Electric vehicles, such as buses, are charged at external charging stations. Charging stations use a specific charge protocol to moderate the process of charging an electric vehicle. A charge protocol refers to a series of steps and/or procedures used to establish communication between the vehicle and the charger, and safely deliver power to the vehicle. To charge a vehicle, the charge controller of the vehicle must be adapted to recognize and operate under the charge protocol used by the charging station. The charge protocol includes software (algorithms, etc.) and associated hardware (circuitry, etc.) that cooperate to control the charging operation. Currently, there are a number of charge protocols (proprietary protocols of vehicle manufacturers and industry standard protocols) used by different charging station and electric vehicle manufacturers. One of these standards is SAE J1772, a North American standard maintained by SAE International (Society of Automotive Engineers), which defines the general physical, electrical, communication protocol, and performance requirements for an electric vehicle conductive charging system. Some electric vehicle manufacturers also have proprietary charge protocols (and supporting infrastructure and hardware) which may not be compatible with industry standard protocols and proprietary protocols of other manufacturers. Customers generally desire vehicles which support industry standard charge protocols. Supporting an industry standard protocol, while also servicing an existing customer base, may require the maintenance of two different charging systems, which increases cost and complexity.

Embodiments of the current disclosure may alleviate the problem discussed above and/or other problems in the art. The scope of the current disclosure, however, is defined by the attached claims, and not by the ability to solve any specific problem.

SUMMARY

Embodiments of the present disclosure relate to systems and methods for using multiple charge protocols to charge an electric vehicle. Each of the embodiments disclosed herein may include one or more of the features described in connection with any of the other disclosed embodiments.

In one embodiment, a method of charging an electric vehicle at a charging station is disclosed. The charging station may be configured to provide charge to the vehicle using a charging station charge protocol and the vehicle may be configured to receive charge from the charging station using a vehicle charge protocol. The method may include electrically connecting the charging station to the vehicle, and receiving a signal indicative of the charging station charge protocol. The method may also include selecting the vehicle charge protocol based on the received signal. The selecting may include selecting one charge protocol from multiple charge protocols supported by the vehicle to match the charging station charge protocol. The method may further include charging the vehicle using the selected vehicle charge protocol.

In another embodiment, another method of charging an electric vehicle at a charging station is disclosed. The charging station may be configured to provide charge to the vehicle using a charging station charge protocol and the vehicle may be configured to receive the charge from the charging station using a vehicle charge protocol. The method may include connecting a SAE J1772 connector of the charging station to a SAE J1772 charge port of the vehicle, and detecting a voltage on a proximity detection pin of the SAE J1772 connector. The method may also include selecting SAE J1772 as the vehicle charge protocol if the detected voltage is a first value and a different charge protocol as the vehicle charge protocol if the detected voltage is a second value different from the first value. The method may further include charging the vehicle using the selected vehicle charge protocol.

In yet another embodiment, a method of charging an electric bus at a charging station is disclosed. The charging station may be configured to provide charge to the bus using a charging station charge protocol and the bus may be configured to receive the charge from the charging station using a bus charge protocol. The method may include connecting a SAE J1772 connector of the charging station to a SAE J1772 charge port of the bus, and detecting a voltage on a proximity detection pin of the SAE J1772 connector. The method may also include selecting SAE J1772 as the bus charge protocol if the detected voltage is a first value and a different charge protocol as the bus charge protocol if the detected voltage is a second value different from the first value. The method may further include activating an indicator after the selecting to indicate that the bus is ready to receive charge from the charging station, and charging the bus using the selected vehicle charge protocol after the indicator is detected.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

The present disclosure describes systems and methods for the conductive charging of an electric bus at charging stations using different charge protocols. While principles of the current disclosure are described with reference to an electric bus, it should be understood that the disclosure is not limited thereto. Rather, the systems and methods of the present disclosure may be used for the conductive charging of any electric vehicle (motorcycle, trains, cars, plane, etc.).

Figure 1:
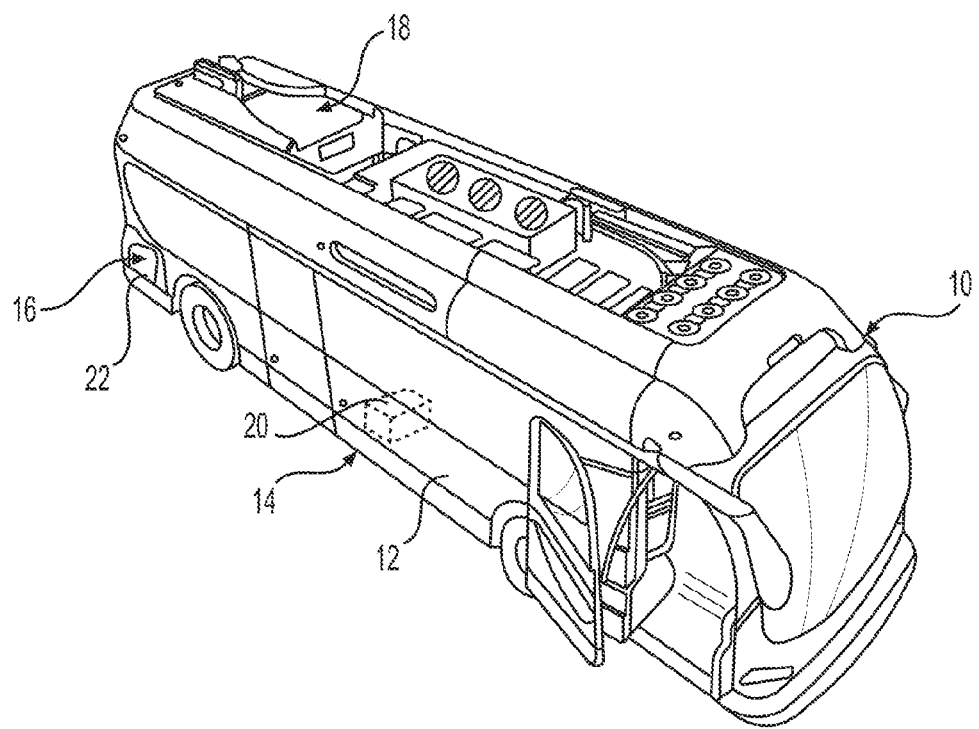
FIG. 1 illustrates an exemplary electric bus of the current disclosure.

FIG. 1 illustrates an electric vehicle in the form of a bus 10. Electric bus 10 may include a body 12 enclosing a space for passengers. In general, body 12 may have any size, shape, and configuration, and may be made of any material (metal, composite, etc.). In some embodiments, bus 10 may be a low-floor electric bus. As is known in the art, in a low-floor bus, there are no steps at the front and/or the back doors of the bus. In such a bus, the floor of the bus 10 is positioned close to the road surface (e.g., about 12-16 inches) to ease passenger exit and entry. In this disclosure, relative terms such as "about," "substantially," "approximately," etc. are used to indicate a possible variation of ±10% in a stated numeric value. Bus 10 may be propelled by an electric motor (not shown). A battery system 14 may store electrical energy to power the motor. The batteries that comprise the battery system 14 may have any chemistry (lithium titanate oxide (LTO), nickel manganese cobalt (NMC), etc.) and construction.

Battery system 14 may be conductively charged (as opposed to inductively charged) by electrically connecting the battery system 14 to an external current source. In some embodiments, the battery system 14 may enable fast charging. By fast charging, the battery system 14 may be recharged (e.g., to greater than about 95% state of charge) in a short time (e.g., less than or equal to about 10 minutes). In some embodiments, the bus 10 may be charged more slowly. The battery system 14 may be electrically connected to an external energy source through a charge port 16 or a charging interface 18 of bus 10. In some embodiments, the charge port 16 may be positioned on a side surface of the bus 10 and the charging interface 18 may be positioned on its roof. It should be noted that these locations are only exemplary. In general, the charge port 16 and the charging interface 18 may be positioned at any location (rear, front, etc.) of the bus 10.

To charge the bus 10 using the charging interface 18, when bus 10 is positioned below an over-hanging charge head of an external charging station (not shown), the charge head automatically descends and electrically connects with the charging interface 18. When electrical contact is established between the charging interface and the charge head, current is directed into the bus 10 to charge the battery system 14. After charging is complete, the charge head automatically retracts (i.e. ascends) and allows the bus 10 to proceed along its route. U.S. Pat. No. 9,352,658; U.S. Patent Publication No. 2013/0193918; and U.S. patent application Ser. No. 14/980,697, commonly-assigned to the assignee of the current application, describe exemplary embodiments of the charging interface 18 and corresponding charging processes. These references are incorporated by reference in their entirety herein.

Figure 2:
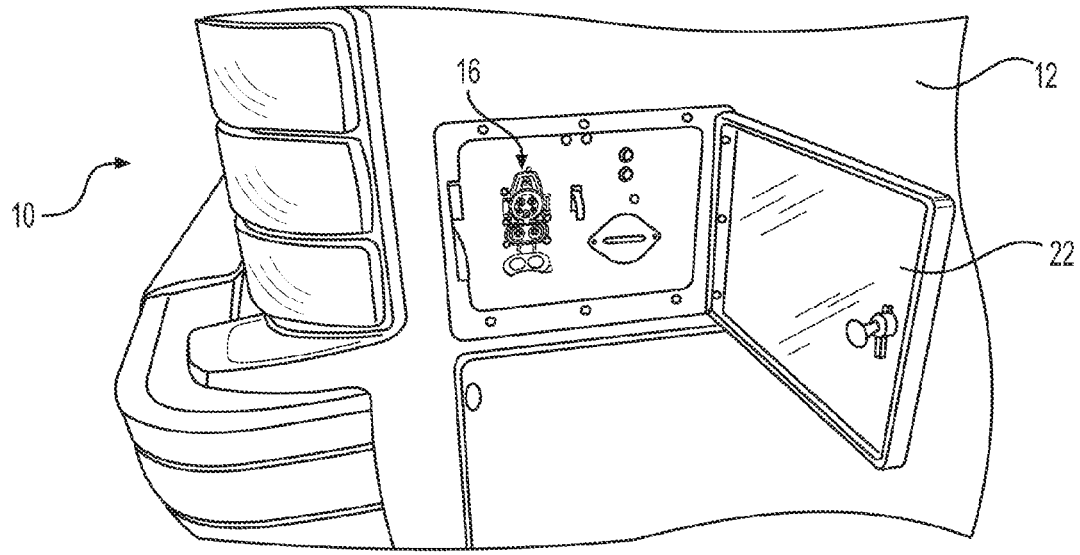
FIG. 2 illustrates an exemplary charge port of the bus of FIG. 1.

To charge battery system 14 through the charge port 16, a charge cable 40 (shown in FIG. 4B) is plugged into the charge port 16. In some embodiments, charge port 16 may be a standardized charge port (e.g., SAE J1772 charge port) that is configured to receive a corresponding standardized connector (e.g., SAE J1772 connector). As would be recognized by people of ordinary skill in the art, SAE J1772 charge port and SAE J1772 connector are a standardized pair of electrical connectors for electric vehicles in the US. To protect the charge port 16 of bus 10 from the environment (rain, snow, debris, etc.), a hinged lid 22 may cover the charge port 16 when not in use. FIG. 2 illustrates a portion of the bus with the lid 22 open to expose an exemplary charge port 16. The charge port 16 is electrically coupled to the battery system 14 of bus 10. When the charge cable 40 is plugged into the charge port 16, electric current from a charging system (coupled to the charge cable) is directed to the battery system 14 for charging. Typically, the bus 10 is charged using the roof-top charging interface 18 when the bus 10 is travelling on a route, and the bus 10 is charged through the charge port 16 when it is parked in a bus depot (e.g., at night, between trips, etc.).

Figure 3:
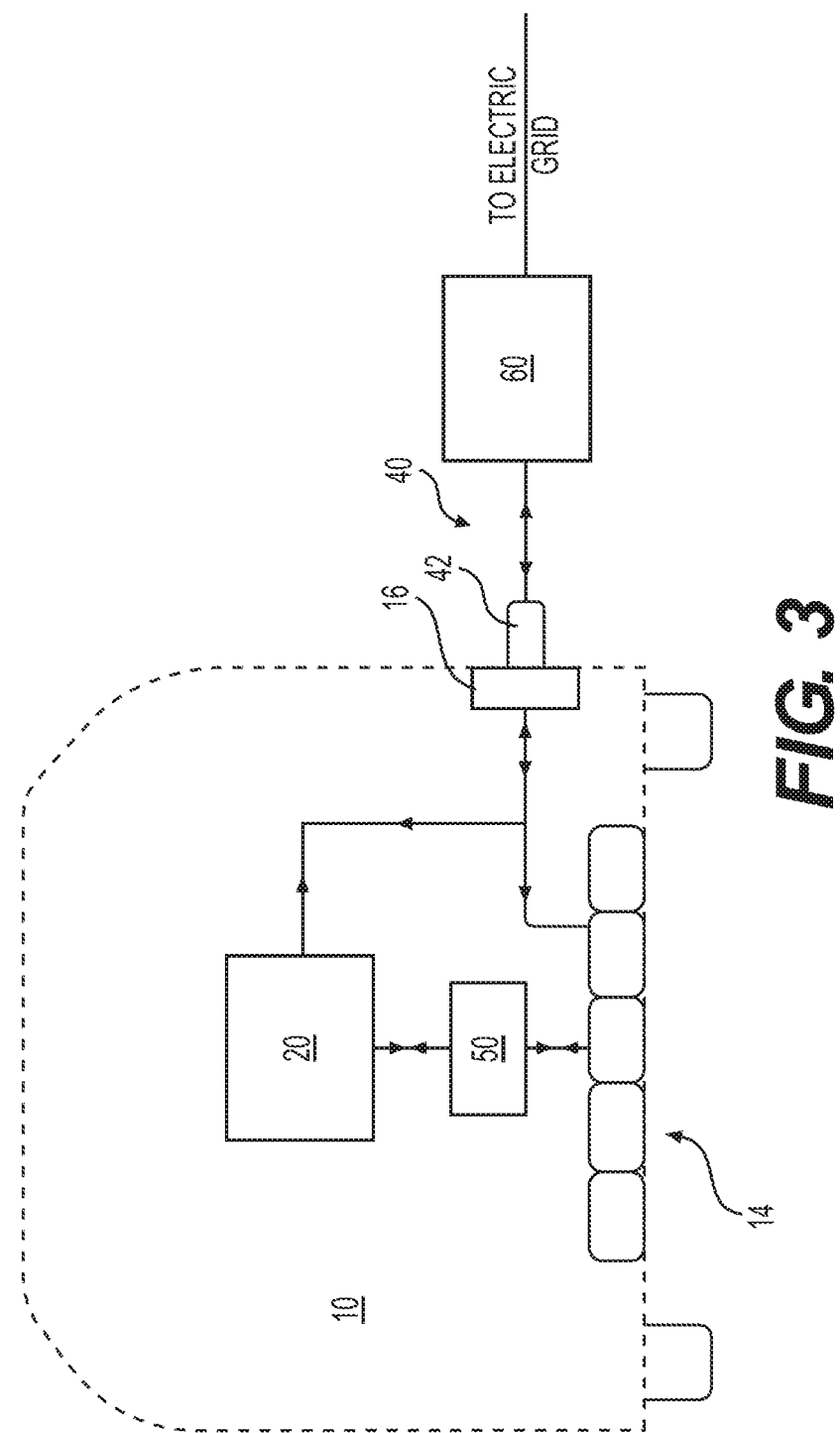
FIG. 3 is a schematic illustration of charging the bus using the charge port.

FIG. 3 is a simplified schematic illustration of charging the battery system 14 through the charge port 16. Single phase or three-phase AC current from an electrical grid (that supplies power to the geographic locality) is directed to a charging system 60 (also referred to in industry standards as Electric Vehicle Supply Equipment), converted into DC current in the charging system 60, and then directed to the charge port 16 through the charge cable 40. The charging system may include electrical components (e.g., rectifier, power converter, switches, safety mechanisms, etc.) to convert the AC grid current to the DC current supplied to the charge port 16. In some embodiments, AC current from the grid may be directly provided to the bus 10 and converted to DC in the bus. The charge port 16, which is electrically connected to the battery system 14, directs the current to the battery system 14 for charging. A battery management system (BMS 50) of the bus 10 may monitor various operating parameters of the battery system 14 during charging. For example, BMS 50 may monitor parameters such as the voltage, current, charge level, temperature, etc. of the different cells of the battery system 14, and protect the battery system 14 from operating outside its safe operating conditions. During charging, the BMS 50 may report data relating the battery system 14 and the charging to a charge controller 20.

The charge controller 20 may control and manage the charging process. Although the charge controller 20 is illustrated as being part of the bus 10, this is only exemplary. In some embodiments, the charge controller 20 may be a part of the charging system 60 external to the bus 10. In some embodiments, the charge controller 20 may include controllers (and algorithms) in both the bus 10 and the charging system 60. In some embodiments, the charge controller 20 may be adapted to charge the bus 10 using charging systems 60 that use one particular charge protocol (e.g., a manufacturer's proprietary charge protocol or an industry standard protocol). The charge protocol describes the mechanism of power transfer and information exchange between the charging system 60 and the bus 10 during charging. The charge controller 20 may include algorithms (and related hardware) that are configured to charge the battery system 14 using the particular charge protocol followed by the charging system 60.

In some embodiments, the charge controller 20 may be configured to charge the bus 10 using multiple different charge protocols (e.g., manufacturer's proprietary protocol, SAE J1772, CHAdeMO, etc.). As known to people skilled in the art, SAE J1772 is a standardized charge protocol followed by several US and German vehicle manufacturers, and CHAdeMO is a charge protocol followed by several Japanese vehicle manufacturers. The ability of the charge controller 20 to support different charge protocols may enable the bus 10 to be charged using charging systems 60 that follow different charge protocols. For example, the bus may be charged using charging systems that follow a manufacturer's proprietary charge protocol and by charging systems that follow a different charge protocol (e.g., the industry standard SAE J1772 or CHAdeMO charge protocols). In some embodiments, the charge controller 20 may include multiple algorithms (and hardware) corresponding to the different supported charge protocols. When a charge cable 40 (connected to a charging system 60) is plugged into the charge port 16, the charge controller 20 detects the charge protocol used by the charging system 60, and selects the appropriate algorithm (and hardware) to use during the charging process. The charge controller 20 may detect the charge protocol used by the charging system 60 based on one or more signals received at the charge port 16.

Figure 4B:
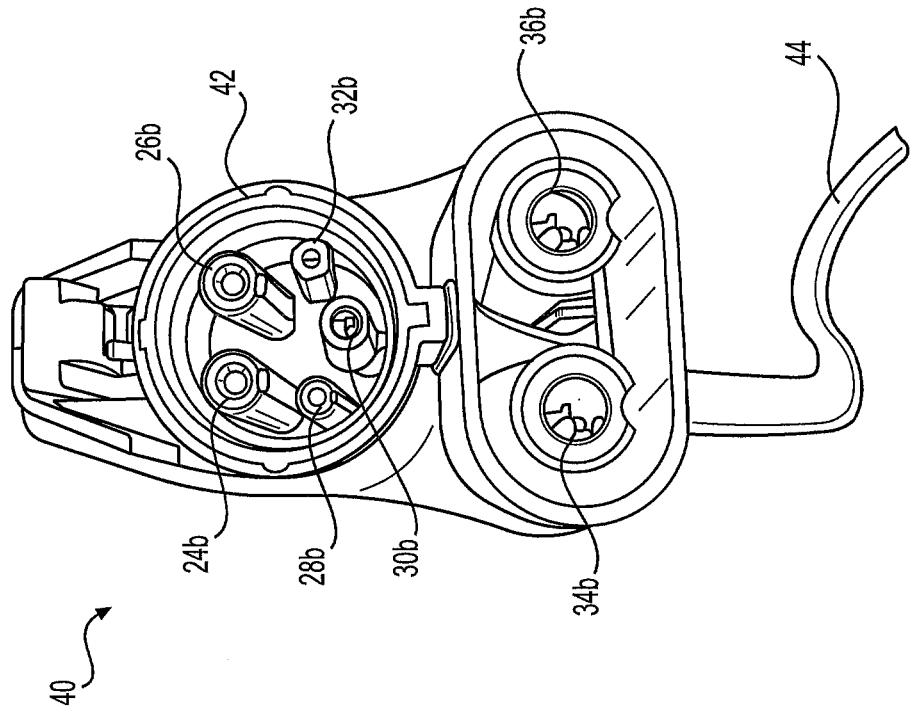
FIG. 4B is an exemplary charge cable for use with the charge port of FIG. 4A.
Figure 4A:
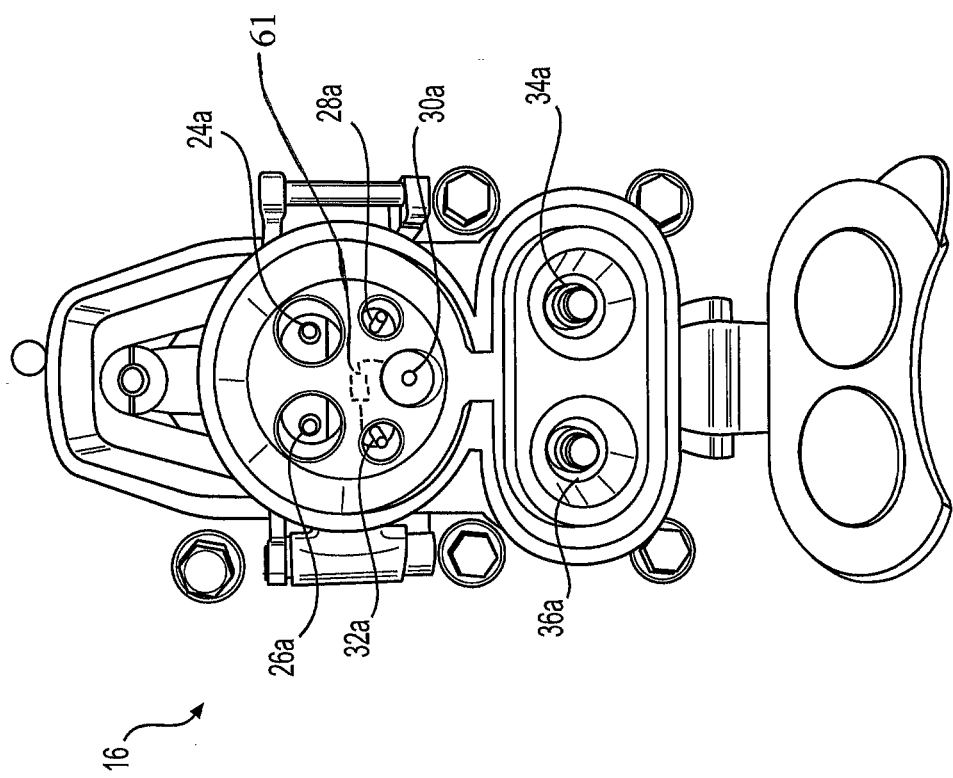
FIG. 4A is an enlarged view of the charge port of FIG. 2.

FIG. 4A illustrates an exemplary charge port 16, and FIG. 4B illustrates a charge cable 40 that plugs into the charge port 16. The charge cable 40 of FIG. 4B includes a connector 42 attached at the end of a cable 44. As would be recognized by people of ordinary skill in the art, connector 42 is an industry standard SAE J1772 connector and charge port 16 is a mating SAE J1772 charge port. The end of the cable 44, opposite the connector 42, is connected to the charging system 60 (see FIG. 3). During charging, the connector 42 is plugged into the charge port 16. In the description below, reference will be made to both FIGS. 4A and 4B. When the bus 10 is parked (at the bus depot, etc.), the lid 22 is opened (see FIG. 2), and the connector 42 of the charge cable 40 is manually plugged into the charge port 16 to begin charging the battery system 14 of the bus 10. The charge port 16 includes multiple sockets (or female contacts) arranged in a pattern, and the connector 42 includes an equal number of prongs (or male contacts) arranged (and sized) to fit into corresponding sockets of the charge port 16. Although an SAE J1772 charge port and connector pair are described herein, in general, any type of connector and charge port (having any number of prongs and sockets arranged in any pattern) may be used. In connector 42 of FIG. 4B, the prongs are arranged in the same pattern as the sockets in FIG. 4A, so that the connector 42 may plug into the charge port 16. Typically, the number of prongs in the connector 42 are the same as the number of sockets in the charge port 16. However, equal number of prongs and sockets is not a requirement.

The charge port 16 of FIG. 4A includes five sockets (first socket 24a, second socket 26a, third socket 32a, fourth socket 30a, and fifth socket 28a) arranged in a circular pattern and an additional two sockets (sixth socket 34a, seventh socket 36a) spaced apart from the circularly arranged sockets. The mating connector 42 of FIG. 4B includes seven prongs (first prong 24b, second prong 26b, third prong 32b, fourth prong 30b, fifth prong 28b, sixth prong 34b, and seventh prong 36b) arranged to mate with the corresponding sockets of the charge port 16. In the discussion below, each mating socket and prong pair is referred to as a pin. That is, the first socket 24a and the first prong 24b are collectively referred as the first pin 24, and the second socket 26a and the second prong 26b are collectively referred as the second pin 26, etc.

When the connector 42 of FIG. 4B is plugged into the charge port 16 of FIG. 4A, the signals on each pin (24, 26, etc.) depend on the charge protocol used by the charging system 60. Table 1 indicates the signal on each pin when the charging system 60 uses two different exemplary charge protocols (SAE J1772 charge protocol and a manufacturer's proprietary charge protocol). It should be noted that although two specific protocols are used in the description below, this is only exemplary. In general any number of different charge protocols may be used.

TABLE 1

Signals on each pin for two exemplary charge protocols.

| Pin | SAE J1772 charge protocol | Proprietary charge protocol |
|---|---|---|
| 24 | AC line 1 (L1) | CAN High |
| 26 | AC line 2 (L2) | CAN Low |
| 28 | Proximity detection signal | Pilot Charger to Bus (PCTB) |
| 30 | Ground | Ground |
| 32 | Control pilot | Pilot Bus to Charger (PBTC) |
| 34 | DC+ | DC+ |
| 36 | DC− | DC− |

In embodiments where the charging system 60 follows the industry standard SAE J1772 charge protocol, pins 24 and 26 are configured to receive AC current signals (hot and neutral) when AC current is used to charge the bus 10. It should be noted that the SAE J1772 charge protocol is configured to charge an electric vehicle using both AC and DC current. As such, in industry standard references, it is referred to as a "Combined Charging System," or CCS. Since DC current is used to charge the bus 10 in the exemplary embodiment discussed herein, pins 24 and 26 do not receive any signals when SAE J1772 charge protocol is used. Pin 30 is a ground pin which is connected to a common ground of bus 10. Pin 28 (called the "proximity detection" pin in SAE J1772 terminology) receives the proximity detection signal which indicates that the connector 42 is connected to a bus 10. When J1772 charge protocol is used, the magnitude of the signal on pin 28 may be about 1.51 volts DC. Pin 32 (called the "control pilot" pin in SAE J1772 terminology) receives control pilot signals that are used to coordinate the charging operation between the bus 10 and the charging system 60. When a signal on pin 28 indicates that a bus 10 is connected to the charging system 60, the J1772 charge protocol uses power-line communication (using the IPV6 communication protocol) to exchange messages between the charge controller 20 and the charging system 60 through pins 32 and 30. After the charging parameters are set, the charge controller 20 activates a resistor 61 having a preselected resistance value between pins 32 and 30 to indicate that it is ready to receive charge. Upon sensing the presence of this resistor 61, the charging system 60 activates DC current flow to the bus 10 through pins 34 and 36. Alternatively, as would be recognized by people in the art, in general, any electrical parameter (voltage, resistance, etc.) having a preselected magnitude may be used to indicate the completion of the set up.

In embodiments where the charging system 60 is configured to charge the bus 10 using a manufacturer's proprietary charge protocol, pins 24 and 26 receive digital controller area network (CAN) high and low signals. Controller area network is an industry standard communications protocol which is used extensively in the automotive industry. Signals on these pins (24 and 26) are used to communicate charging related information between the charge controller 20 and the charging system 60. For example, signals on pins 24 and 26 may indicate to the charging system 60, the maximum voltage that may be used to charge the battery system 14. A signal on the pin 28 (PCTB signal) may indicate, to the charge controller 20, the set of CAN messages to use in communicating with the charging system 60. For example, the bus 10 may be configured to be charged at different models or types of charging systems 60 (each using the manufacturer's proprietary charge protocol). The PCTB signal on pin 28 may indicate to the charge controller 20 the type of CAN messages (CAN id) to use in communicating with the charging system 60. When using the manufacturer's proprietary charge protocol, the magnitude of the voltage on pin 28 may be about 2.08 volts DC. Pin 30 is a ground pin which is connected to the common ground.

A signal on pin 32 (PBTC signal) indicates to the charging system 60 that the bus 10 is ready to receive DC power through pins 34 and 36. For example, when the connector 42 is plugged into the charge port 16, the charge controller 20 and the charging system 60 sets limits for the charging operation (maximum current, voltage etc.) using CAN messages though pins 24 and 26. When the charge controller 20 is ready to receive power from the charging system 60, the charge controller 20 activates a signal (having a preselected characteristic) on pin 32 which indicates to the charging system 60 that setup is complete, and prompts the charging system 60 to begin current flow through the connector 42. As charging proceeds, the charge controller 20 and the charging system 60 send periodic messages (using the CAN protocol) to each other through pins 24 and 26 to communicate charging related information (e.g., updated amount of power needed by battery system 14, etc.).

When a SAE J1772 connector of a charging system is plugged into a SAE J1772 charge port of the bus, the charge controller of the bus recognizes the charge protocol used by charging system based on a magnitude of the voltage on the proximity detection pin of the charge port (i.e., pin 28), automatically selects the same charge protocol in the bus based on the voltage, and charges the bus without any input from the user. This capability of the bus 10 to select a charge protocol to match the charging station charge protocol enables the bus 10 to be charged at charging stations which use different charge protocols.

Figure 5:
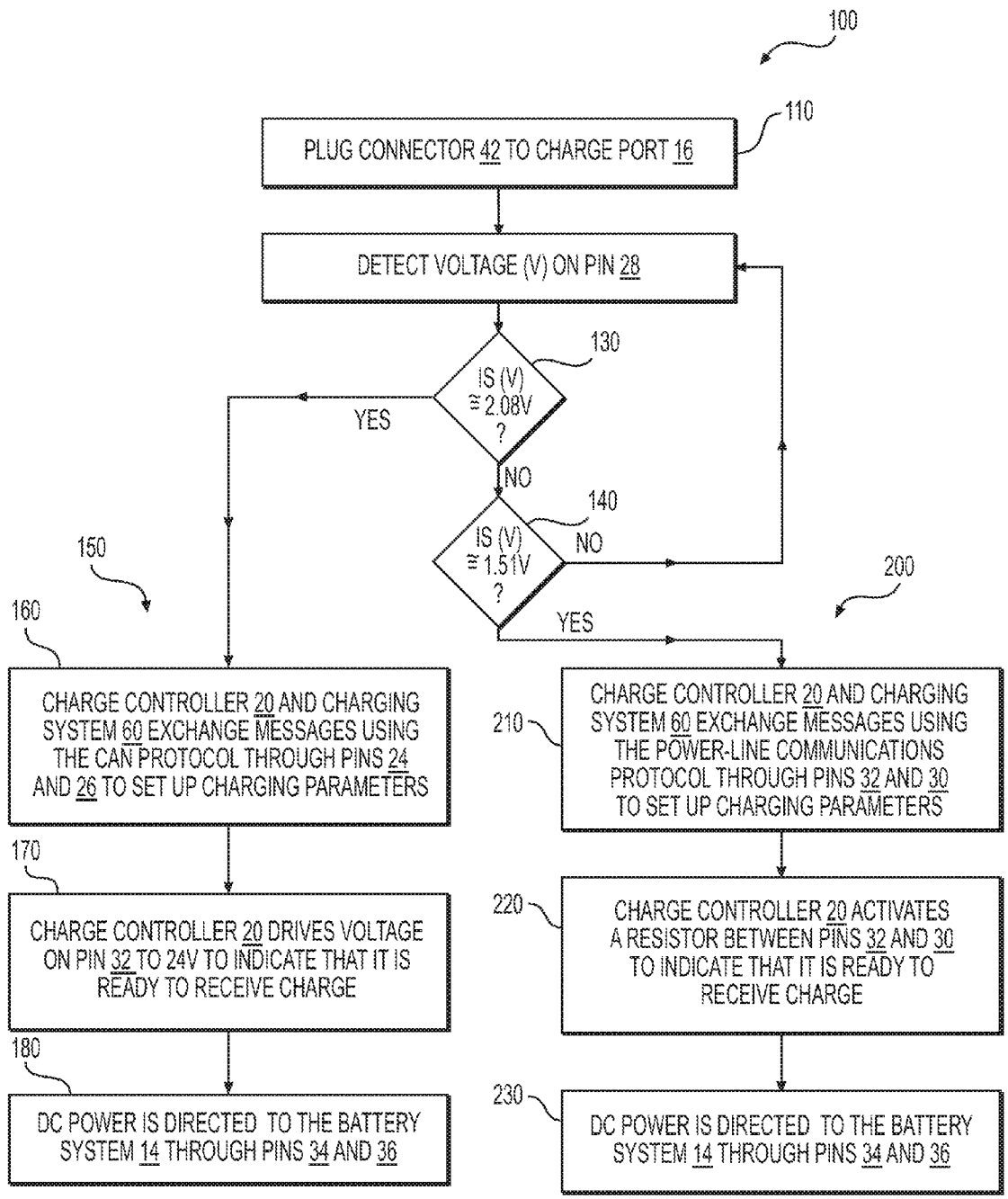
FIG. 5 is an exemplary method of charging the bus of FIG. 1 through the charge port.

FIG. 5 is a flow chart that illustrates an exemplary method 100 of charging the battery system 14 of bus 10 through the charge port 16. After the bus 10 is parked, connector 42 of the charge cable 40 (connected to the charging system 60) is plugged into the charge port 16 of bus 10 (step 110). Once the connector 42 is plugged in, the charge controller 20 detects the voltage (v) on pin 28 of the charge port 16 (step 120). If voltage (v) is about 2.08V (step 130) the charge controller 20 determines that the charging system 60 is using the manufacturer's proprietary charge protocol, and if voltage (v) is about 1.51 V (step 140), the charge controller 20 determines that the charging station is using SAE J1772 charge protocol. It should be noted that these voltage levels are only exemplary, and in general, any voltage level may be used to distinguish between different supported charge protocols.

If the manufacturer's proprietary charge protocol is being used (i.e., step 130=yes), the charge controller 20 performs the series of steps identified in FIG. 5 as steps 150. And, if the SAE J1772 charge protocol is being used (step 140=yes), the charge controller 20 performs steps 200. That is, if voltage (v) on pin 28 is about 2.08V (step 130=yes), the charge controller 20 and the charging system 60 exchange messages using the CAN protocol through pins 24 and 26 to set up charging parameters (step 160). These charging parameters include the voltage and the current during charging. After the charging parameters have been set, the charge controller 20 drives the voltage on pin 32 to 24V to indicate that the setup is complete (step 170). Upon detection of this voltage level on pin 32, the charging system 60 directs DC power (based on the preset charging parameters) into the bus 10 through pins 34 and 36 (step 180). This DC power is used to charge the battery system 14. During charging, the charge controller 20 and the charging system 60 exchange periodic messages regarding the charging operation (how much additional power is needed, etc.).

If voltage (v) on pin 28 is about 1.51V (step 140=yes), the charge controller 20 and the charging system 60 exchange messages using the power-line communications protocol through pins 32 and 30 to set up charging parameters (step 210). After the charging parameters have been set, the charge controller 20 activates a 1.3 k) resistor between pins 32 and 30 to indicate that it is ready to receive charge (step 220). Upon detection of the resistor, the charging system directs DC current to the battery system 14 through pins 34 and 36 (step 230). During the charging process, the charge controller 20 and the charging system 60 exchange periodic information through pin 32.

That is, when the charge cable 40 (connected to the charging system 60) is plugged into the charge port 16 of the bus 10, the charge controller 20 of the bus determines the charge protocol used by the charging system 60 (based on the characteristic of the signal (e.g., voltage, etc.) on a pin), selects the same charge protocol in the bus, and charges the bus using that charge protocol, transparent to the user. In the discussion above, the characteristic of the signal used to detect the type of charge protocol being used is voltage on pin 28. However, this is not a limitation. In general, any characteristic of the signal (voltage, current, etc.) on any preselected pin may be used to detect the type of charge protocol, and charge the bus using that protocol. The ability of the bus 10 to charge at charging stations using different charge protocols increases the versatility of the bus and decreases operating cost.

While the current disclosure describes the charging of an electric bus, it should be understood that the disclosure is not limited thereto. Rather, the principles described herein may be used to charge any electrical vehicle. Further, although a bus that is configured to charge at charging stations using two specific charge protocols (manufacturer's proprietary charge protocol and SAEJ1772 charge protocol) is described herein, this is only exemplary. In general, the current disclosure may be applied to charge an electric vehicle at charging stations using any charge protocol (e.g., different manufacturers' proprietary charge protocols, other industry standard protocols such as CHAdeMO, etc.). Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description. For example, while certain features have been described in connection with various embodiments, it is to be understood that any feature described in conjunction with any embodiment disclosed herein may be used with any other embodiment disclosed herein.

We claim:

1. A method of conductive charging an electric vehicle at a charging station, the charging station being configured to provide charge to the vehicle using a charging station charge protocol and the vehicle being configured to receive charge from the charging station using a vehicle charge protocol, comprising:
   connecting an electrical connector of the charging station to a charge port of the vehicle, the electrical connector including multiple electrodes that mate with electrodes of the charge port to form multiple contacts that electrically connect the charging station to the vehicle;

receiving, at the vehicle, through a first contact of the multiple contacts, a signal indicative of the charging station charge protocol;

automatically selecting the vehicle charge protocol to be a first charge protocol if the signal received through the first contact is a first value and selecting the vehicle charge protocol to be a second charge protocol if the signal received through the first contact is a second value different from the first value, wherein the first charge protocol and the second charge protocol are different charge protocols that define conductive charging of the vehicle by providing DC current to the charge port from the charging station; and charging the vehicle using the selected vehicle charge protocol.

2. The method of claim 1, wherein automatically selecting the vehicle charge protocol includes selecting SAE J1772 as the charge protocol if the signal is a voltage of about 1.5 V and selecting a different charge protocol if the signal is a voltage of about 2.08 V.

3. The method of claim 1, wherein connecting an electrical connector of the charging station includes connecting a SAE J1772 connector of the charging station to a SAE J1772 charge port of the vehicle.

4. The method of claim 3, wherein:
receiving the signal includes receiving a voltage on a proximity detection pin of the SAE J1772 charge port; and
automatically selecting the vehicle charge protocol includes selecting (a) SAE J1772 as the charge protocol if the received voltage is about 1.51 V DC, and (b) a different charge protocol if the received voltage is about 2.08 V DC.

5. The method of claim 4, wherein automatically selecting the vehicle charge protocol includes directing a signal from the vehicle to a control pilot pin of the SAE J1772 connector if the different charge protocol is selected.

6. The method of claim 1, wherein charging the vehicle includes directing DC current from the charging station into the electric vehicle.

7. The method of claim 1, wherein the electric vehicle is a bus.

8. The method of claim 1, wherein automatically selecting the vehicle charge protocol includes selecting a vehicle charge protocol that matches the charging station charge protocol.

9. A method of conductive charging an electric vehicle at a charging station, the charging station being configured to provide charge to the vehicle using a charging station charge protocol and the vehicle being configured to receive charge from the charging station using a vehicle charge protocol, comprising:
connecting a SAE J1772 connector of the charging station to a SAE J1772 charge port of the vehicle;
detecting a voltage on a proximity detection pin of the SAE J1772 connector;
selecting SAE J1772 charge protocol as the vehicle charge protocol if the detected voltage on the proximity detection pin of the SAE J1772 connector is a first value and selecting a different charge protocol as the vehicle charge protocol if the detected voltage is a second value different from the first value, wherein the SAE J1772 charge protocol and the different charge protocol are two different charge protocols that define conductive charging of the vehicle by providing DC current to the SAE J1772 charge port from the charging station; and
charging the vehicle using the selected vehicle charge protocol.

10. The method of claim 9, wherein the first value is about 1.5 V and the second value is about 2.08 V.

11. The method of claim 9, further including directing a signal from the vehicle to a control pilot pin of the SAE J1772 connector if the different charge protocol is selected.

12. The method of claim 11, wherein charging the vehicle includes initiating flow of energy into the vehicle after detection of the signal from the vehicle.

13. The method of claim 9, further including activating a resistor between two pins of the SAE J1772 charge port if SAE J1772 is selected as the vehicle charge protocol.

14. The method of claim 13, wherein charging the vehicle includes initiating flow of energy into the vehicle after detection of the activated resistor.

15. The method of claim 13, wherein the electric vehicle is a bus.

16. The method of claim 9, wherein charging the vehicle includes directing DC current from the charging station into the electric vehicle.

17. A method of conductive charging an electric bus at a charging station, the charging station being configured to provide charge to the bus using a charging station charge protocol and the bus being configured to receive charge from the charging station using a bus charge protocol, comprising:
connecting a SAE J1772 connector of the charging station to a SAE J1772 charge port of the bus;
detecting a voltage on a proximity detection pin of the SAE J1772 connector;
selecting SAE J1772 charge protocol as the bus charge protocol if the detected voltage on the proximity detection pin of the SAE J1772 connector is a first value and selecting a different charge protocol as the bus charge protocol if the detected voltage is a second value different from the first value, wherein the SAE J1772 charge protocol and the different charge protocol are two different charge protocols that define conductive charging of the bus by providing DC current to the SAE J1772 charge port from the charging station;
activating an indicator after the selecting to indicate that the bus is ready to receive charge from the charging station; and
charging the bus using the selected vehicle charge protocol after the indicator is detected.

18. The method of claim 17, wherein activating an indicator includes directing a signal from the vehicle to a control pilot pin of the SAE J1772 connector if the different charge protocol is selected.

19. The method of claim 17, wherein activating an indicator includes activating a resistor between two pins of the SAE J1772 charge port if SAE J1772 is selected as the vehicle charge protocol.

20. The method of claim 17, wherein charging the bus includes directing DC current from the charging station into the bus.

* * * * *